No. 12,463. REISSUED MAR. 13, 1906.
G. I. KING.
UNDERFRAMING FOR BOX CARS.
APPLICATION FILED FEB. 12, 1906.
2 SHEETS—SHEET 1.
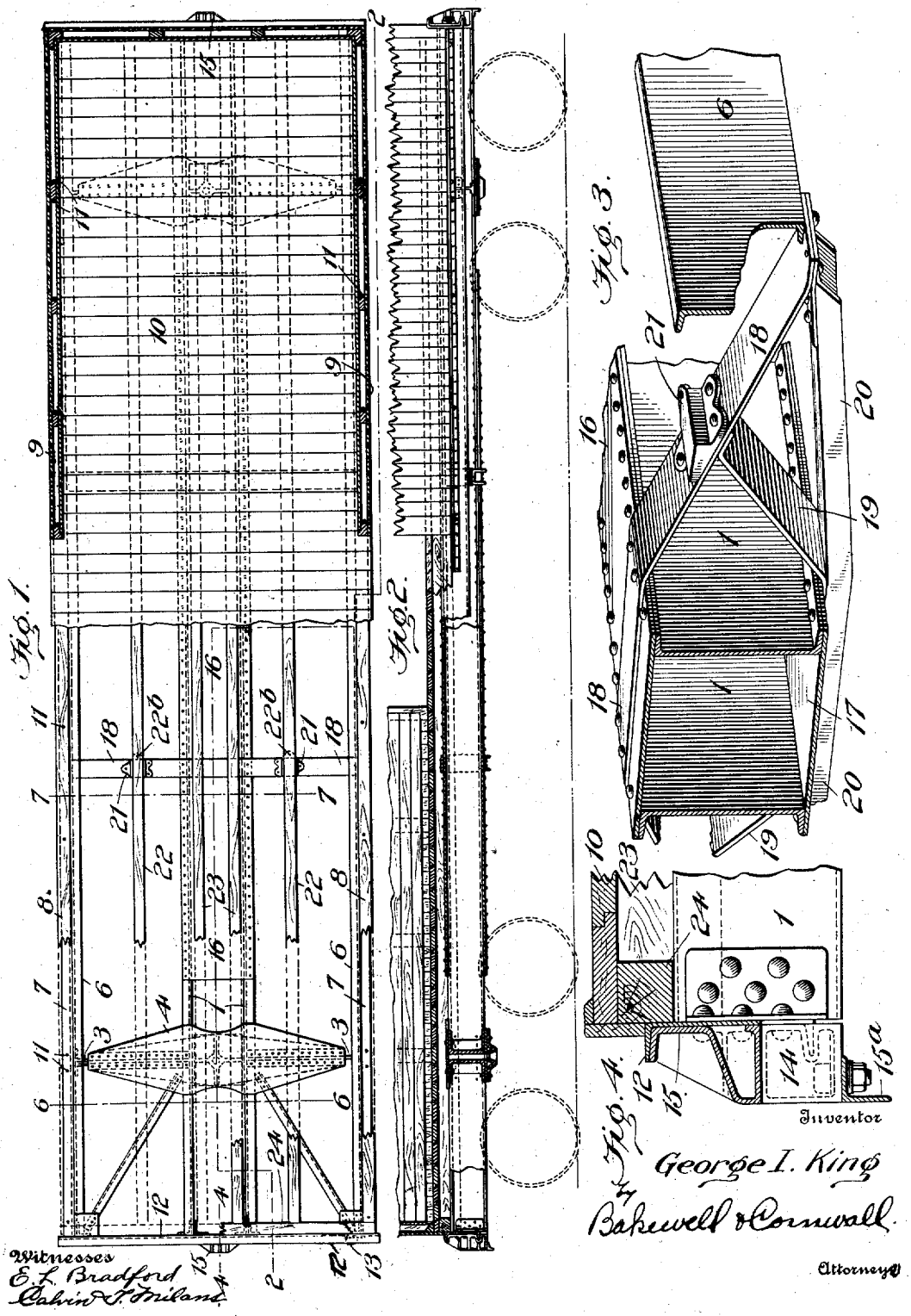

No. 12,463. REISSUED MAR. 13, 1906.
G. I. KING.
UNDERFRAMING FOR BOX CARS.
APPLICATION FILED FEB. 12, 1906.
2 SHEETS—SHEET 2.
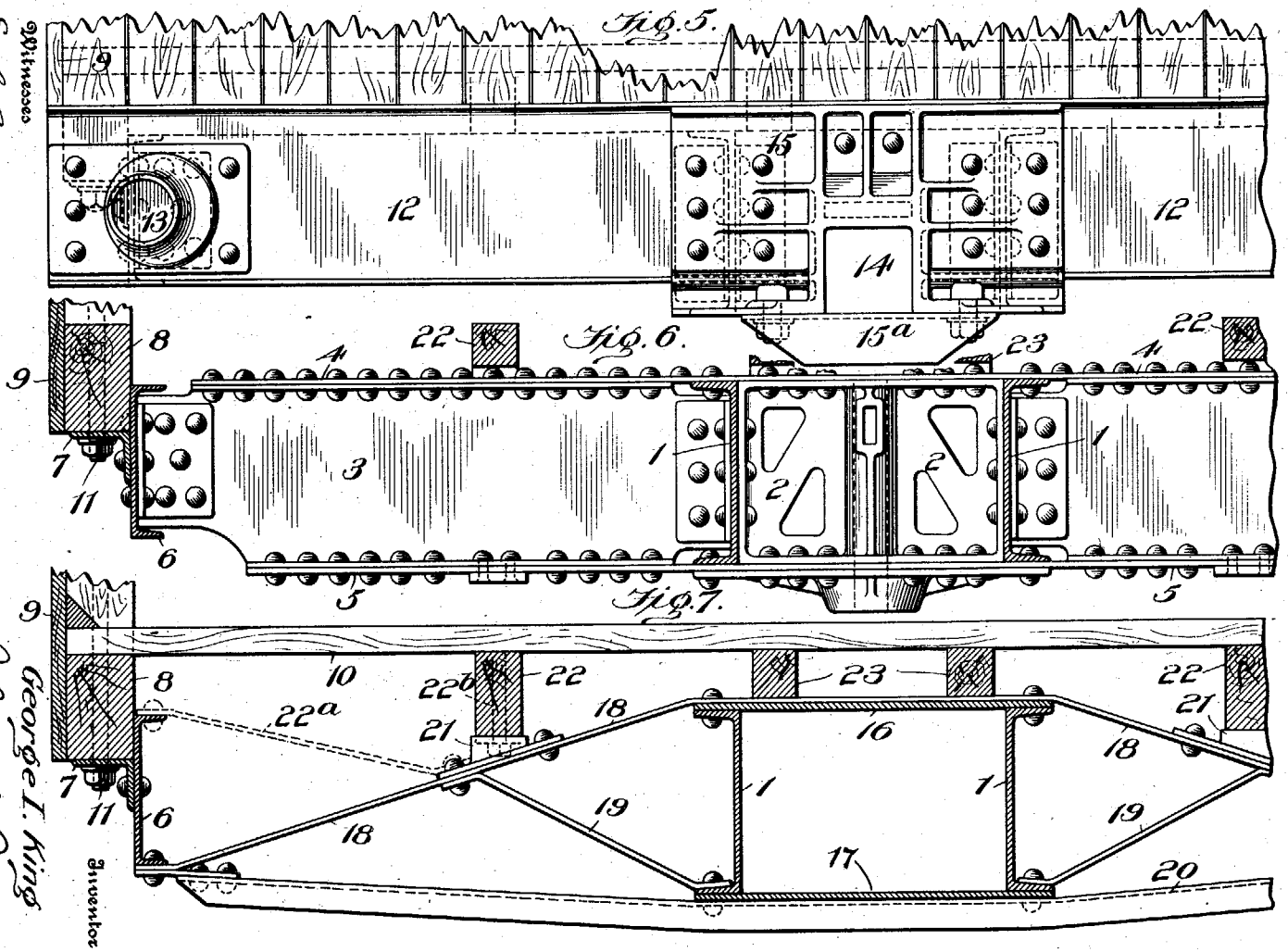
Witnesses
E. L. Bradford
Calvin T. Milans
Inventor
George I. King
By Bakewell & Cornwall
Attorneys

UNITED STATES PATENT OFFICE.

GEORGE I. KING, OF MIDDLETOWN, PENNSYLVANIA, ASSIGNOR TO AMERICAN CAR & FOUNDRY COMPANY, OF ST. LOUIS, MISSOURI, A CORPORATION OF NEW JERSEY.

UNDERFRAMING FOR BOX-CARS.

No. 12,463. Specification of Reissued Letters Patent. Reissued Mar. 13, 1906.

Original No. 678,573, dated July 16, 1901. Application for reissue filed February 12, 1906. Serial No. 300,804.

*To all whom it may concern:*

Be it known that I, GEORGE I. KING, a citizen of the United States, residing at Middletown, Dauphin county, Pennsylvania, have invented a certain new and useful Improvement in Underframing for Box-Cars, of which the following is a full, clear, and exact description, such as will enable others skilled in the art to which it appertains to make and use the same, reference being had to the accompanying drawings, forming part of this specification, in which—

Figure 1 is a horizontal sectional view, part of the floor-decking being broken away to more clearly show my improved underframing. Fig. 2 is a sectional view on the line 2 2 of Fig. 1. Fig. 3 is a perspective view of a portion of said underframing. Fig. 4 is a sectional view on the line 4 4 of Fig. 1. Fig. 5 is an end elevational view showing a portion of the end sill. Fig. 6 is a sectional view on the line 6 6 of Fig. 1, showing the bolster; and Fig. 7 is a sectional view on the line 7 7 of Fig. 1, showing the truss, intermediate supports for the sills, and nailing-strips.

This invention relates to a new and useful improvement in underframing designed particularly, though not exclusively, for use in box-car construction.

The object of my present invention is to support the load of the car on a single girder-like structure, in which are included metallic members, usually designated as the "center sills" of the car. This single center sill, in addition to supporting practically the entire load of the car, also forms struts for trussed structures arranged intermediate the bolsters, said trussed structures carrying some of the longitudinal sills or nailing-strips. The longitudinally-arranged box-girder sill practically terminates at the bolsters of the car, the members thereof extending beyond said bolsters for supporting the draft-rigging. An end sill is provided to which the draft and side sills are secured, said end sill extending above the draft and side sills to form an abutment for the transversely-arranged nailing-strip at the end of the car, to which nailing strip or timber the end wall is secured.

The invention consists in the construction, arrangement, and combination of the several parts, all as will hereinafter be described, and afterward pointed out in the claims.

In the drawings, 1 indicates channels having their flanges presented outwardly, which channels are commonly known as the "center sills," they extending from end to end of the car. These channels carry draft-rigging between their ends, as is well known, and consequently take up and transmit the buffing stresses communicated thereto.

2 indicates a casting arranged between the sills 1, and 3 the I-shaped members arranged on each side of said sill 1 opposite the casting 2. 4 is a top cover-plate, and 5 a bottom cover-plate. All of said parts are appropriately attached together by rivets, forming what is commonly known as the "body-bolster." The bottom cover-plate 5 carries the usual center and side bearings.

To the ends of the web members 3 of the bolster are secured channels 6, said channels having their flanges preferably presented inwardly, as shown more clearly in Figs. 6 and 7. These channels 6 serve practically as side sills.

Channels 6 have continuous or discontinuous angles 7 riveted to their outer faces, which angles not only serve to strengthen the channels 6, but also afford a support for a wooden sill 8, which wooden sill serves as a nailing-strip for the attachment of the side walls 9 and floor-decking 10 of the car. This sill 8 is secured in position upon the angle 7 by the vertical suspending-rods 11, which pass therethrough and through said angle 7, and, if desired, horizontally-arranged bolts may be employed for clamping the sill to the channel 6.

Channels 6 preferably extend continuously the length of the car and are attached through suitable connection-plates to the end sill 12. This end sill, as shown in Figs. 4 and 5, is made up of a channel whose flanges are presented outwardly, the upper edge of said end sill extending above the channels 1 and 6.

Pole-pockets 13 are preferably riveted to the ends of the end sill. The end sill is recessed or notched in its lower edge at about its center, as at 14, for the reception of the shank of the draw-bar, and a casting 15, strengthened by suitable webs, is riveted to the end sill, said casting preferably extending below the end sill flush with the bottom flanges of the channels 1, said casting being recessed to accommodate the shank of the draw-bar. By referring to Fig. 4 it will be seen that this casting is so shaped as to receive the bottom flanges of the end sill on each side of the recess 14, in addition to which said casting projects forwardly beyond the end sill to form a buffer. An angle 15[a] bridges the recess 14 and serves as a carry-arm for the draw-bar, said angle being secured in position by suitable bolts.

The channels 1, as before stated, preferably extend from end sill to end sill continuously, said channels forming members of the body-bolster, and between these body-bolsters the channels have riveted to them top and bottom cover-plates, (designated by the numerals 16 and 17, respectively,) which cover plates form with the channels a box-girder structure practically continuous between the bolsters. The top cover-plate 16 forms the compression member of the box-girder, while the bottom cover-plate forms the tension member, and if the load to be carried so demands additional cover-plates may be added, as required in reinforcement of the plates shown. This box-girder center sill is preferably strong enough to carry the entire weight of the car-body and its contained load, being what might be termed the "backbone" of the car. While this construction results in an unusually-heavy center sill, it is very desirable on account of the extreme alternation of stresses to which this member is subjected and obviates the necessity for using small floor-beams, which have heretofore been employed, which beams extended from center to side sills, being supported in position by numerous connection-angles.

In order to support the side sills between the bolsters, I provide one or more trussed structures, such as illustrated in Figs. 3 and 7. This trussed framing consists of a flat plate or bar 18, which is riveted to the top cover-plate through the flanges of the channels 1, said plate extending downwardly and outwardly, the ends thereof being riveted to the bottom flanges of the side-sill members 6.

19 indicates one of the compression members of the trussed structure, which are riveted to the bottom flanges of the channels 1 and to the plates 18 at points practically midway between the center and side sill members. 20 indicates the other compression member of the trussed structure, in the form of a channel-bar whose ends are riveted coincidently with the ends of the plate 18 to the bottom flanges of the side-sill members 6, said channel 20 being also riveted to the bottom flanges of the channels 1. In addition to serving as one of the compression members of the trussed structure this channel-bar 20 also serves to tie the side sills in position and strengthens the entire framing.

21 indicates a saddle or seat block riveted to the plate 18 for supporting the longitudinal wooden sill-nailing strip 22. If desired, a plate 22[a] (shown in dotted lines in Fig. 7) may be riveted to the top flange of the side-sill member 6 and to the plate 18 coincident with the point of attachment of the member 19.

The structure above described forms what might be designated as a "compound" truss, of which the box-girder center sill forms a central strut, affording considerable bearing area to the members 18 and 20. The weight applied through the sill 22 places the inner end of plate 18 in tension and the plate 19 in compression. The above statement is made disregarding the presence of the side-sill member 6, which side-sill member also transmits some of the load to the extreme outer end of the trussed framing above described and in so doing places the plate 18 in tension and the bar 20 in compression, (the upper end of said plate being in additional tension, due to the load transmitted through the sill 22.) If the plate 22[a] is present, it will serve to tie the upper edges of the side-sill members 6 in position against displacement from side blows. As shown in Figs. 1 and 2, I prefer to use two trussed framings, which may be designated as "supports for the side sills," said frames extending on each side of the main or center sill.

23 indicates nailing-strips for the floor-decking, which are arranged upon the box-girder center sill, as shown in Fig. 7, said strips being held in position in any suitable manner. The sills 22, heretofore referred to, are preferably held to their seats by bolts 22[b]. 24 indicates a wooden strip extending transversely the car, (see Fig. 4,) which fits against the upper end of the end sill, said wooden strip extending some distance above the end sill and affording a nailing-base for the attaching devices which secure the lower edge of the end wall in position.

The superstructure comprising the side and end walls, the vertical posts and diagonals, roof, &c., forms no part of my present invention, and therefore has not been shown in the drawings.

While I have stated that the box-girder center sill is preferably capable of carrying the weight of the car and its contained load between the body-bolsters, (or between "trucks," as it is commonly termed,) it is obvious that the side sills and truss-frames herein described are capable of and do, in fact, carry some portion of the weight of the car and its load, which portion, however, is relatively small, being estimated at about two-tenths, the box-girder center sill carrying the remainder, or eight-tenths, of the weight of the car and its contained load.

It will be observed from the drawings that the manner in which the box-girder center sill is made and the way in which the truss-frames are mounted thereon obviates the necessity to get at any portion of the interior of the box-girder beam, all the rivets in my construction being driven from the exterior. It will also be observed that the trussed frames permit of the use of an intermediate sill of good depth without requiring said sills to be notched at each truss-support. This is desirable where the wooden sills are unsupported for a considerable distance, in the instance of the car shown in the drawings being over eight feet for a thirty-four-foot car.

While I have shown the plate 18 as continuous from side sill to side sill, it is obvious that said plate can be widened at its connection to the center sill to provide room for a greater number of rivets, so as to permit the plate to be discontinuous.

I am aware that minor changes in the arrangement, construction, and combination of the several parts of my device can be made and substituted for those herein shown and described without in the least departing from the nature and principle of my invention.

Having thus described the invention, what is claimed as new, and desired to be secured by Letters Patent, is—

1. In an underframing for cars, the combination with body-bolsters and the center sill, of a side sill attached to the ends of the body-bolsters, a truss-frame intermediate the body-bolsters for supporting the side sill from the center sill, said truss-frame comprising a tension member in the form of a flat plate or bar, and a compression member in the form of a commercially-rolled bar; substantially as described.

2. In an underframing for cars, the combination with the body-bolsters, of a center sill extending from bolster to bolster, said center sill being capable of carrying the entire weight of the car and its contained load, a side sill attached to the ends of the bolsters, and a truss-frame supported by the center sill intermediate the bolsters, said truss-frame supporting the side sill at its extremity and comprising a flat-plate tension member attached to the under side of the side sill and the top of the center sill, and a commercially-rolled compression member attached to the under side of the side and center sills; substantially as described.

3. In an underframing for cars, the combination with body-bolsters, of side-sill members attached to the ends of said bolsters, a center sill, and trussed frames of the character described for supporting said side sills intermediate the bolsters; substantially as described.

4. In an underframing for cars, the combination with body-bolsters, of side-sill members attached to the ends thereof, center sills supported by said bolsters, truss-frames for supporting the side-sill members intermediate the bolsters, and intermediate sills which are likewise supported by said truss-frames intermediate the bolsters; substantially as described.

5. In an underframing for cars, the combination with the center and side sills, of a metallic end sill projecting thereabove, and a wooden nailing-strip abutting against the upwardly-projecting edge of the metallic end sill; substantially as described.

6. In an underframing for cars, the combination with draft and side sills, of a metallic end sill whose upper edge projects above the same, and a wooden nailing-strip supported by the side and draft sills and abutting against the upwardly-projecting edge of the end sill, said wooden nailing-strip extending above said end sill to form a nailing-base for the end wall of the car; substantially as described.

7. In an underframing for cars, the combination with the bolsters, of a side-sill member, an angle secured to said side-sill member below its upper edge, and a wooden sill supported by said angle and resting against the upper edge of the side-sill member; substantially as described.

8. In an underframing for cars, the combination with a side-sill member in the form of a channel 6, an angle 7 riveted to said channel at a point below the upper edge thereof, a wooden sill 8 supported by said angle and resting against the upper edge of the channel, and means for securing said sill 8 in position; substantially as described.

9. In an underframing for cars, the combination with body-bolsters, of a center sill and side sills attached to said bolsters, a plate 18 attached to the upper edge of the center sill and to the lower edge of the side sill and a plate 19 attached to the lower edge of the center sill and to the plate 18 at a point intermediate the center and side sills, said plate 19 extending only to the plate 18; substantially as described.

10. In an underframing for cars, the combination with the body-bolsters, of center and side sills attached to said bolsters, a plate 18 having its ends attached to the lower faces of the side sills, the middle portion of said plate extending up over the center sill, plates 19 riveted to the lower portion of the center sill and to the plates 18 at points between the center and side sills, and a tie-bar 20 extending from side sill to side sill, said tie-bar passing under the center sill; substantially as described.

11. In an underframing for cars, the combination with the bolsters, of center and side sills attached to said bolsters, and truss-frames for supporting the side sills at points intermediate the bolsters, said truss-frames comprising a plate 18, plates 19, a channel 20, and tie-plates $22^a$; substantially as described.

12. In an underframing for cars, the combination with the center and side sills, of a plate 18 extending from the upper edge of the center sill to the lower edge of the side sill and riveted to each, a saddle carried by said plate for affording a seat for an intermediate sill, and a plate 19 riveted to the lower edge of the center sill and to the plate 18 at a point approximately beneath the saddle; substantially as described.

13. In an underframing for cars, the combination with a center sill, of a side sill, an intermediate sill, and a compound truss-frame lying in a transverse plane for supporting said side and intermediate sills; substantially as described.

14. In an underframing for cars, the combination with the body-bolsters, of the box-girder center sill supported thereby, channel side sills attached to the ends of the body-bolsters, plates 18 riveted to the bottom flanges of the side sills and extending over the box-girder center sill, a bar 20 riveted to the bottom flanges of the channel side sills and extending under the box-girder center sill, plates 19 riveted to the lower edges of the box-girder center sill and to the plate 18 at points intermediate the center and side sills, saddles carried by the plate 18 approximately over the points of attachment of the plates 19 thereto, all of said parts being made of suitable metal, and wooden intermediate sills supported by said saddles; substantially as described.

15. The combination with a channel forming the main member of an end sill whose lower edge is notched or recessed to receive the shank of a coupler, of a casting riveted to said channel for strengthening the same around the notched portion, said casting accommodating the bottom flanges of the channel on each side of the notch and projecting forwardly to serve as a buffer; substantially as described.

16. The combination with a channel-bar forming the main member of an end sill which is notched in its lower edge to accommodate the shank of the draw-bar, a casting riveted to said channel and provided with webs for strengthening the same, said casting having a notch or recess to accommodate the shank of the draw-bar, and a carry-arm removably secured to said casting; substantially as described.

17. The combination with a center sill, of a wooden sill 22 and plates 18 and 19 forming a truss-frame for supporting the sill 22, the vertical axis of the sill 22 meeting the line of intersection of the plates 18 and 19; substantially as described.

18. In a car, the combination with body-bolsters, of a center sill supported thereby, and transversely-arranged truss-frames on the center sill intermediate the body-bolsters for supporting the sides of the car; substantially as described.

19. In a car, the combination with body-bolsters, of a center sill supported thereby, and laterally-extending truss-frames on each side of the center sill, said truss-frames being in approximately the same transverse plane, for supporting the sides of the car; substantially as described.

20. In a car, the combination with body-bolsters, of a center sill supported thereby, and truss members secured to the upper and lower edges of the center sill and extending laterally in converging lines for supporting the sides of the car; substantially as described.

In testimony whereof I hereunto affix my signature, in the presence of two witnesses, this 29th day of January, 1906.

GEORGE I. KING.

Witnesses:

JOHN H. FRANK,
WM. A. CROLL.